United States Patent
Ashkenazi et al.

(10) Patent No.: US 10,540,509 B2
(45) Date of Patent: Jan. 21, 2020

(54) FILE-TYPE WHITELISTING

(71) Applicant: Cisco Technology, Inc., San Jose, CA (US)

(72) Inventors: Oded Ashkenazi, Haifa (IL); Moshe Kravchik, Ramat Beit Shemesh (IL); Arie Haenel, Jerusalem (IL); Benyamin Hirschberg, Givat-Zeev (IL)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 15/616,984

(22) Filed: Jun. 8, 2017

(65) Prior Publication Data

US 2018/0357416 A1    Dec. 13, 2018

(51) Int. Cl.
| | |
|---|---|
| G06F 21/00 | (2013.01) |
| G06F 21/62 | (2013.01) |
| G06F 21/50 | (2013.01) |
| G06F 21/55 | (2013.01) |
| G06F 21/56 | (2013.01) |

(52) U.S. Cl.
CPC .......... *G06F 21/6209* (2013.01); *G06F 21/50* (2013.01); *G06F 21/55* (2013.01); *G06F 21/56* (2013.01); *G06F 21/62* (2013.01)

(58) Field of Classification Search
CPC .. G06F 21/62; G06F 21/6209; G06F 21/6218; G06F 21/50; G06F 21/51; G06F 21/55; G06F 21/554; G06F 21/56; G06F 21/562; G06F 21/566
See application file for complete search history.

(56) References Cited

U.S. PATENT DOCUMENTS

| | | | |
|---|---|---|---|
| 9,055,093 B2 | 6/2015 | Borders | |
| 9,317,686 B1 | 4/2016 | Ye et al. | |
| 9,436,826 B2 | 9/2016 | Kapoor et al. | |
| 9,495,638 B2 | 11/2016 | Schneider et al. | |
| 2011/0087692 A1* | 4/2011 | Masone | G06F 8/60 707/769 |
| 2015/0169873 A1* | 6/2015 | Ngair | G06F 21/56 726/23 |
| 2016/0352761 A1 | 12/2016 | McGrew et al. | |
| 2016/0378988 A1* | 12/2016 | Bhashkar | G06F 21/566 726/24 |

FOREIGN PATENT DOCUMENTS

KR    1614809    4/2016

OTHER PUBLICATIONS

Sedgewick, Adam et al.; Guide to Application Whitelisting (2015).

* cited by examiner

*Primary Examiner* — Edward Zee

(57) ABSTRACT

In one embodiment, a method for protecting a file is implemented on a computing device and includes: intercepting a file-access request from an application-process for the file; searching a whitelist for a whitelist entry associated with the application-process and a file-type for the file, where the whitelist entry indicates that the application-process is allowed to access files of the file-type, and upon determining according to the searching that the application-process is allowed to perform the file-access request, allowing the application-process to access the file according to the file-access request.

20 Claims, 3 Drawing Sheets

FILE-TYPE WHITELISTING

FIELD OF THE INVENTION

The present invention generally relates to the prevention of attacks by malicious software.

BACKGROUND OF THE INVENTION

Ransomware is malicious software designed to block access to a computer system or a part thereof until a "ransom", typically a monetary sum, is provided by the owner or user of the computer. Ransomware has been steadily increasing as a threat to safe computing. One of the most common types of ransomware entails the encryption of some, or all, of the files on a computer system, where a ransom is demanded in exchange for a decryption key to decrypt the files.

BRIEF DESCRIPTION OF THE DRAWINGS

The presently disclosed embodiments will be understood and appreciated more fully from the following detailed description, taken in conjunction with the drawings in which.

DESCRIPTION OF EXAMPLE EMBODIMENTS

Overview

A method for protecting a file is implemented on a computing device and includes: intercepting a file-access request from an application-process for the file; searching a whitelist for a whitelist entry associated with the application-process and a file-type for the file, where the whitelist entry indicates that the application-process is allowed to access files of the file-type, and upon determining according to the searching that the application-process is allowed to perform the file-access request, allowing the application-process to access the file according to the file-access request.

Description

One possible defense against ransomware is application whitelisting. Application whitelisting is the practice of specifying a list, i.e., a "whitelist", of approved software applications that are permitted to be present and/or execute on a computer system. In theory, a computer system using application whitelisting may prevent ransomware attacks by preventing a ransomware application from being executed on the computer system. However, in practice the efficacy of application whitelisting as a defense against ransomware is somewhat limited, since ransomware often infiltrates a computer system masquerading as a different application. For example, a given word processing application may be whitelisted on a given computer system. If a copy of the word processing application is infected by ransomware, the infected application may be allowed to execute on the computer system by virtue of its whitelisted status, thereby exposing the computer system to the ransomware despite the implementation of the whitelist.

Figure 1:
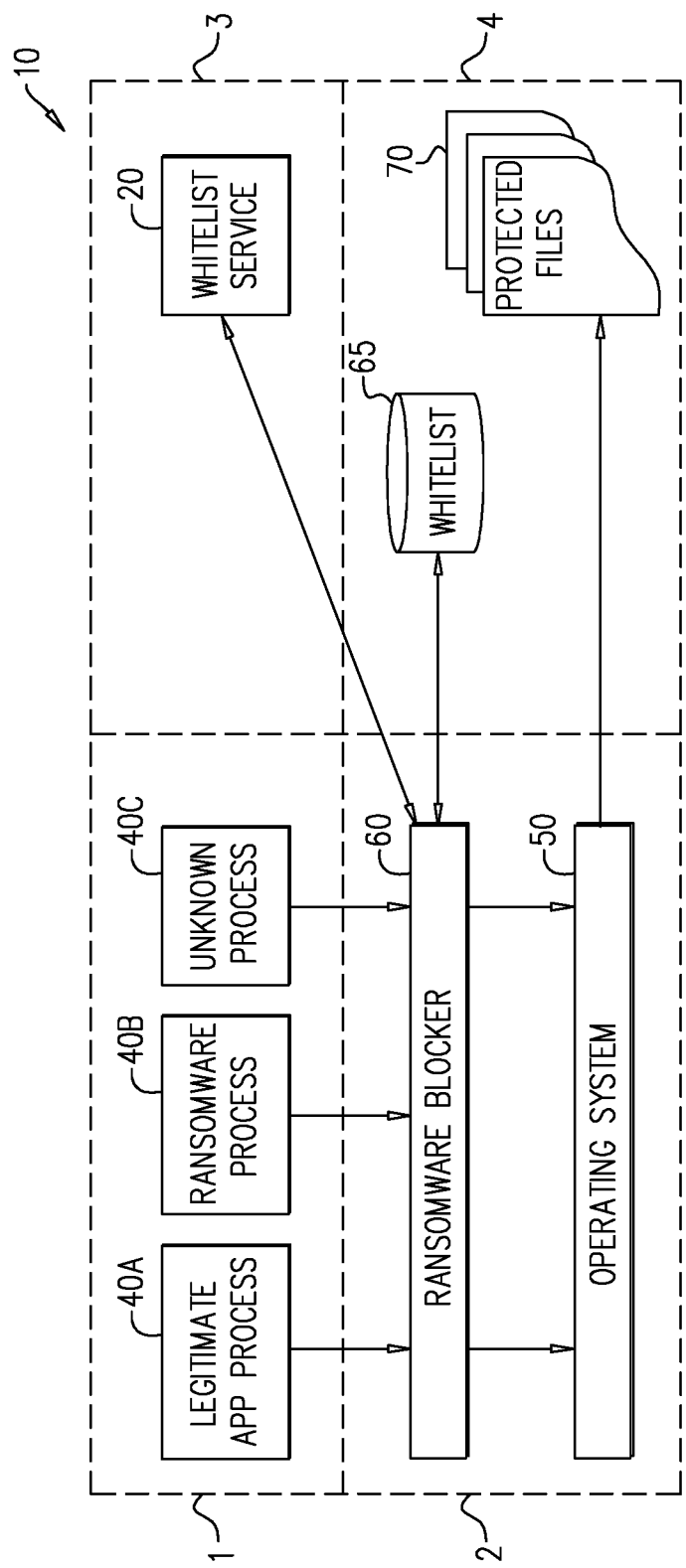
FIG. 1 is a schematic illustration of an exemplary ransomware prevention architecture, constructed and operative in accordance with embodiments described herein.

In accordance with embodiments described herein, file-type based whitelisting may improve defense against ransomware attacks. File-type based whitelisting entails specifying a list of applications that may access or modify a given file-type. Reference is now made to FIG. 1, which illustrates an exemplary ransomware prevention architecture 10, constructed and operative in accordance with embodiments described herein to employ file-type based whitelisting to protect a computer system's files.

Architecture 10 comprises process domain 1, system domain 2, service domain 3, and file domain 4. In accordance with embodiments described herein, process domain 1, system domain 2, and file domain 4 may be implemented on a single computing device or system. In some embodiments, however, file domain 4 may be implemented on one or more other computing devices or systems, instead of, or in addition to, the same computing device or system on which process domain 1 and system domain 2 are implemented. In such a case, system domain 2 may communicate with file domain 4 via a communications network (not shown), such as, but not limited to, a local area network or the Internet. Service domain 3 may be implemented on the same computing device or system as process domain 1, system domain 2, and/or file domain 4. Alternatively, service domain 3 may be implemented on a separate computing device or system, and communicate with the other domains described herein with respect to FIG. 1 over a communications network (not shown), such as, but not limited to, a local area network or the Internet.

File domain 4 comprises whitelist 65 and protected files 70. Whitelist 65 represents a list of applications and/or processes that are allowed to access and/or manipulate some or all of protected files 70 according to associated file-types. A file's file-type is typically, although not necessarily, identified according to a filename suffix. For example, a word processing application or process may be whitelisted to access files with filename suffixes such as, for example, ".doc" or ".docx". Similarly, a spreadsheet application or process may be whitelisted to enable access of files with filename suffixes such as, for example, ".xls" or ".xlsx".

It will be appreciated that in some systems, a file's file-type may be identified according to other indications. For example, there may be identifying patterns within the file itself. Such file-types may be identified using content-based file-type detection. It will also be appreciated that content-based file-type detection may be employed to identify a file's file-type even if an identifying filename suffix is associated with the file.

As a protective measure, whitelist 65 may be configured to be inaccessible from entities in process domain 1. For example, whitelist 65 may be located in an area of memory physically or logically separate from protected files 70, such that whitelist 65 may not be accessed by processes 40. As such, in some embodiments, whitelist 65 may be located in system domain 2. As a further measure of protection, whitelist 65 may be encrypted and cryptographically signed to protect it from tampering. In addition, whitelist 65 may also be protected in a manner similar to the protection provided for protected files 70. For example, the filename for an exemplary whitelist 65 may be "whitelist.wtl", and an entry in whitelist 65 may designate one or more applications or processes, e.g., "whitelist.exe" that may access files with a filename suffix of ".wtl".

Process domain 1 comprises legitimate process 40A, ransomware process 40B, and unknown process 40C (referred to hereinafter collectively as processes 40). Legitimate process 40A may represent a process or application that may be allowed to access a given file-type. For example, legitimate process 40A may be a word processing process listed in whitelist 65 as whitelisted for access of files with a filename suffix of ".doc" or ".docx". Ransomware process 40B may be a ransomware process or application that is configured to maliciously attack a user's computer system. It will be appreciated that there may not be an entry for ransomware process 40B in whitelist 65; ransomware process 40B may not be authorized to access any of protected files 70. Unknown process 40C may be any process or application for which there is no corresponding entry in whitelist 65 for any file-type. Unknown process 40C may also be a process or application for which there is a corresponding entry in whitelist 65 that does not correspond with a given file-type that unknown process 40C is currently seeking to access.

System domain 2 comprises operating-system 50 and ransomware blocker 60. Operating-system 50 may be implemented as any suitable computer operating-system, such as, for example, versions of Windows®, Unix®, Linux®, etc. Ransomware blocker 60 may operate at the kernel level, thereby isolating ransomware blocker 60 from attacks from malicious user-level processes in process domain 1. Accordingly, ransomware blocker 60 may be implemented as a kernel module, filter driver, or similar entity configured to intercept file-access requests from process domain 1 to operating-system 50 for protected files 70. Such file-access requests may include, for example, write requests, rename requests, delete requests, etc. It will be appreciated that depending on the operating-system used to implement operating-system 50, the available file-access requests may differ somewhat either functionally and/or semantically.

Accordingly, ransomware blocker 60 may be configured to intercept file-access requests from processes 40 before they are acted upon by operating-system 50. Once a file-access request has been intercepted, based on the entries in whitelist 65, ransomware blocker may determine whether the requesting process from among processes 40 is permitted to perform the requested file-access action vis-à-vis one or more of the files in protected files 70.

For example, ransomware blocker 60 may access whitelist 65 to search for an entry for the requesting process (from among processes 40) that corresponds to the file-type of the file being accessed from among protected files 70. If the search is successful, ransomware blocker 60 may determine that the intercepted request was from legitimate process 40A. If the search is unsuccessful, ransomware blocker 60 may determine that the intercepted request was from ransomware process 40B.

It will be appreciated that an unsuccessful search may not necessarily indicate that the requesting process is ransomware. For example, the requesting process may be unknown process 40C, i.e. a non-malicious process or application that has not yet been registered in association with at least one file-type in whitelist 65. In order to account for such a possibility, ransomware blocker 60 may be configured to prompt the user regarding whether or not to permit unknown process 40C to perform the requested file-access. In accordance with some embodiments described herein, such prompting may include "crowd-sourced" recommendations based at least in part on other users' decisions regarding similar file-access requests from unknown process 40C. In accordance with some embodiments described herein, such prompting may be implemented in the context of two-factor confirmation, where a second device associated with the user (e.g., a mobile device or wearable device) is used to prevent malicious software from intercepting the prompt and "self-approving" its actions. The user may then elect either to allow unknown process 40C to perform the requested file-access, or to prevent unknown process 40C from performing the requested file-access.

In accordance with embodiments described herein, ransomware blocker 60 may update whitelist 65 in accordance with the user's decision. For example, if the user elected to allow the requested file-access, ransomware blocker 60 may update whitelist 65 to indicate that unknown process 40C should be allowed to perform the requested file-access in future attempts without prompting the user. In accordance with some embodiments described herein, ransomware blocker 60 may update whitelist 65 to indicate that unknown process 40C should be temporarily allowed to perform the requested file-access, where future file-access is limited by a condition such, for example, a period of time and/or a number of access attempts. Once the condition has passed (i.e., the period of time has ended or the number of access attempts has been reached), the user may once again be prompted before the requested file-access is allowed.

If the user elected to prevent the requested file-access, ransomware blocker 60 may update whitelist 65 to indicate that unknown process 40C should be prevented from performing the requested file-access in future attempts. For example, ransomware blocker 60 may update a local user policy section in whitelist 65 to indicate that unknown process 40C should be prevented from performing the requested file-access in future attempts, either permanently, or conditionally, as discussed hereinabove with respect to a user decision to allow the requested file-access.

Alternatively, ransomware blocker 60 may be configured to not update whitelist 65 in accordance with the user's decision, i.e., to continue to similarly prompt the user the next time unknown process 40C makes a similar file-access request. In addition, ransomware blocker 60 may be configured to track the user's decisions and include a review of the user's previous decisions when prompting the user for a decision regarding a current file-access request.

In accordance with embodiments described herein, ransomware blocker 60 is operative to periodically update whitelist 65 from an external source, located, for example, in service domain 3. As depicted in FIG. 1, service domain 3 comprises whitelist service 20. In accordance with embodiments described herein, whitelist service 20 may provide regular updates regarding whitelisted process/file-type combinations. In accordance with some embodiments, whitelist service 20 may be operative to provide a list of whitelisted process/file-type combinations to be used when initializing whitelist 65 as part of the implementation of architecture 10.

In accordance with embodiments described herein, ransomware blocker 60 updates whitelist service 20 regarding user decisions for unknown processes 40C. It will be appreciated that there may be a multiplicity of ransomware blockers 60 installed in a multiplicity of computer systems serviced by whitelist service 20. Accordingly, whitelist service 20 may be operative to aggregate user decision updates received from multiple ransomware blockers 60 to "crowdsource" a recommendation for whether or not to allow a given unknown process 40C to perform a given file-access request by using inputs from multiple external sources. Accordingly, ransomware blocker 60 may be configured to request a recommendation from whitelist service 20 when prompting the user to decide whether to allow or to prevent a requested file-access. In some implementations where, for example, the user does not feel qualified to make the allow/prevent decision, ransomware blocker 60 may be configured by default to follow the recommendation received from whitelist service 65 without necessarily prompting the user to make a decision.

Figure 2:
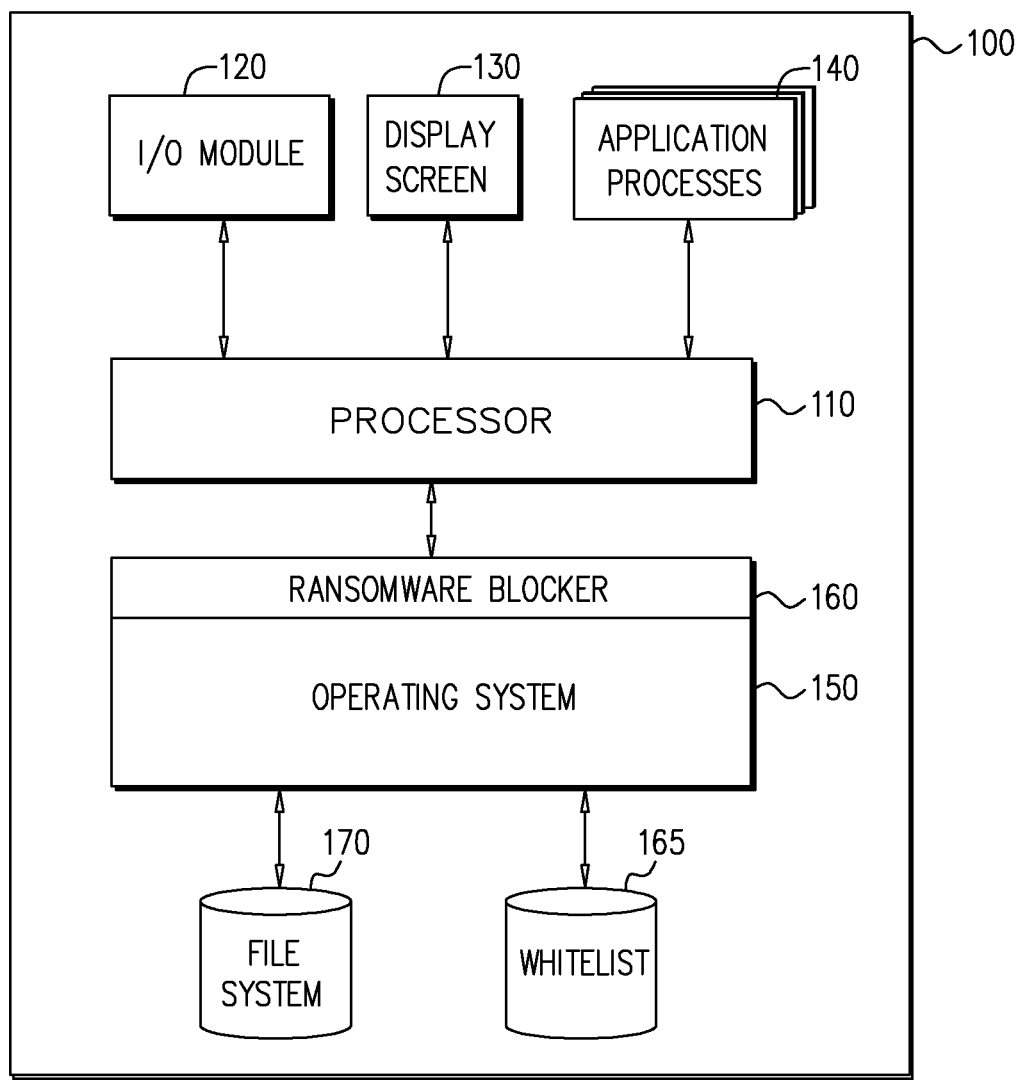
FIG. 2 is a schematic illustration of a computing device in the architecture of FIG. 1.

Reference is now made to FIG. 2, which is a schematic illustration of computing device 100 constructed and operative in accordance with embodiments described herein. Computing device 100 comprises processor 110, I/O module 120, display screen 130, application-processes 140, operating-system 150 and ransomware blocker 160. Computing device 100 is an exemplary environment for the implementation of architecture 10 as depicted in FIG. 1. It will be appreciated that computing device 100 may comprise other components such as may be required to provide operational functionality.

I/O module 120 may be any suitable software and/or hardware component such as a transceiver or network card that may be operative to use protocols such as are known in the art to communicate with whitelist service 20 (FIG. 1) over a communications network such as, for example, the Internet or a local area network. It will be appreciated that display screen 130 may be functional to provide visual output to a user of computing device 100, for example, within the context of a decision to allow/prevent a requested file-access as described with respect to the embodiment of FIG. 1. It will further be appreciated that display screen 130 may be implemented as either an integrated component of computing device 100, or as an attached peripheral device. It will be appreciated that computing device 100 may also comprise other peripheral devices and/or integrated functionality for the input of user instructions (not shown) to computing device 100, e.g., a keyboard, mouse, pointing device, or touchscreen functionality to be used with display screen 130.

It will be appreciated that computing device 100 may comprise more than one processor 110. For example, one such processor 110 may be a special purpose processor operative to execute at least one or more of applications process 140 and/or ransomware blocker 160. Application-process 140 may be generally similar to processes 40 as discussed with reference to the embodiment of FIG. 1; similarly, ransomware blocker 160 may be generally similar to ransomware blocker 60 as discussed with respect to the embodiment of FIG. 1.

Operating-system 150 may be generally similar to operating-system 50 as described with reference to FIG. 1. Whitelist 165 and file system 170 may be generally similar to whitelist 65 and protected files 70 as described with reference to FIG. 1. It will be appreciated that file system 170 may be file storage or a file management function for some or all of the files on computing device 100. For example, file system 170 may be implemented on an integrated storage drive, a removable storage device, or on an external file server. Accordingly, whitelist 165 may also be stored or managed by file system 170. However, whitelist 165 is represented herein as a separate component in order to illustrate its functionality in the context of accessing file system 170 as described with reference to FIG. 1. Operating-system 160 may be operative to at least provide access to whitelist 165 and file system 170. Ransomware blocker 160 is configured to intercept file-access requests from application-processes 140 for operating-system 150.

Figure 3:
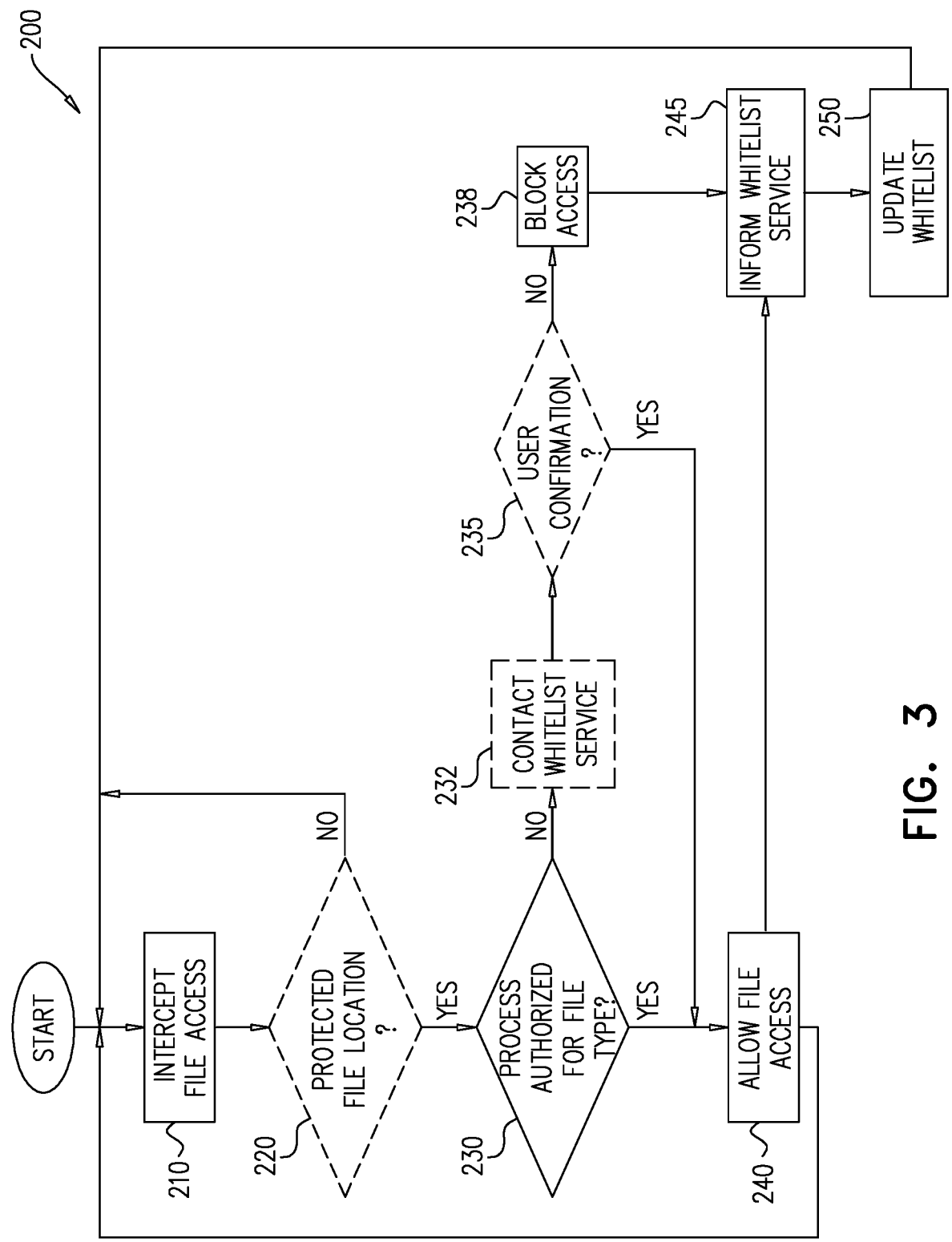
FIG. 3 is a flowchart of a ransomware prevention process to be performed by the computing device of FIG. 2.

Reference is now also made to FIG. 3 which is a flowchart of a ransomware prevention process performed by ransomware blocker 160 in accordance with embodiments described herein. Ransomware blocker 160 may intercept (step 210) a file-access request from one of application-processes 140 (FIG. 2) to operating-system 150 (FIG. 2). For example, one of application-processes 140 may request to write to a word processing document with a file suffix of ".doc" stored in file system 170.

It will be appreciated that it may not be necessary to protect all of the files in file system 170. Ransomware typically targets personal files that are not easily replaced from external sources. For example, operating-system files, such as the files for operating-system 150, are often left untouched by ransomware, since a user may relatively easily restore or reinstall a damaged operating-system without recovering files encrypted, deleted, or otherwise damaged by ransomware. Accordingly, ransomware blocker 160 may optionally determine whether the file-access request (e.g., the write request for the word processing file) is for a file in a protected file location. If not (step 220), control may return step 210; otherwise (step 220) process 200 may continue.

Alternatively, or in addition, step 220 may also determine whether or not the indicated file-type in the file-access request is a type for which permission is necessary. For example, as ransomware typically targets personal files, it may avoid executable files (e.g., ".exe", ".com") that may be associated with software that may also be relatively easy to restore or reinstall without having to recover files encrypted, deleted, or otherwise damaged by the ransomware. Ransomware blocker 160 may therefore be configured to allow access to certain file-types without checking if the requesting process is allowed to perform the requested file-access on the indicated file-type.

Ransomware blocker 160 may then read from whitelist 165 to determine whether the requesting process is authorized to perform the requested file-access for the indicated file-type. For example, if the requesting process is a word processing application (step 230), ransomware blocker 160 may allow (step 240) the requested file-access.

In accordance with embodiments described herein, ransomware blocker 160 may employ cryptographic methods to identify an application identifier for application-processes 140. For example, if an application's publisher's digital signature is provided, it will be used by ransomware blocker 160 to identify an associated application-process 140. For an unsigned application-process 140, ransomware blocker 160 or whitelist service 20 may generate an application identifier by cryptographically signing the application's binaries. Alternatively, ransomware blocker 160 or whitelist 20 may compute an application identifier by hashing the bits of the code segment(s) of application-process 140. It will be appreciated that step 230 may include identification of the application identifier and using it as part of a lookup key to search whitelist 165.

It will be appreciated that malicious software may masquerade as legitimate software by, for example, using code injection techniques and/or by hijacking a running legitimate existing application. To mitigate such attacks, ransomware blocker 160 may be configured to perform in-process runtime signature verification before granting the requested file-access. It will be appreciated that such verification may entail non-insignificant calculations; accordingly such verification may not necessarily be performed upon each access, but rather when the memory layout of the process changes, i.e. when new modules are loaded.

If, as per whitelist 165, the requesting process is not authorized to perform the requested file-access for the indicated file-type (step 230), ransomware blocker 160 may optionally contact (step 232) whitelist service 20 (FIG. 2) via I/O module 120 to receive a recommendation regarding the requested file-access for the indicated file-type. Ransomware blocker 160 may also optionally prompt the user for confirmation (step 235) whether or not to allow the requesting process to access the requested file-type.

It will be appreciated that malicious software may attempt to "impersonate" the user and input a fake user confirmation. In accordance with some embodiments described herein, ransomware blocker 160 may defend against the possibility of a fake confirmation by requiring a two-factor confirmation. For example, the user confirmation may be combined with a verification code sent to the user's mobile device, or with a (time-based) second factor authentication such as, for example, Google Authenticator.

If the user confirms that the requesting process may perform the requested file-access (step 235), ransomware blocker 160 may then allow (step 240) the requesting process to perform the requested file-access. If the user does not confirm the requested access (step 235), ransomware blocker 160 may block (step 238) the requested access.

In accordance with embodiments described herein, ransomware blocker 160 is configured to track the user decisions from step 235 in order to provide additional information and/or recommendations during future iterations of process 200. For example, ransomware blocker 160 may use I/O module 120 (FIG. 2) to inform (step 245) whitelist service 20 of the user's decision to either allow or block access. Ransomware blocker 160 is also configured to update (step 250) whitelist 165 according to the user's decision to either allow or block access. It will be appreciated that the informing and updating of steps 245 and 250 may also include details regarding whether the user decision was permanent, conditional (e.g., valid for a set period of time or iterations of process 200 for the same process requesting file-access for the same file-type), file-access type specific, or one-time (i.e., valid for only the current iteration of process 200).

It will be appreciated that in the absence of optional step 232, process control may flow directly from step 230 to step 235. Similarly, in the absence of both optional steps 232 and 235, process control may flow directly from step 230 to step 238. Similarly, in the absence of optional step 235, process control may flow directly from step 232 to step 238. It will also be appreciated that in such a case where step 232 is performed independently of optional step 235, ransomware blocker 160 may use the recommendation received from whitelist service 20 as a proxy for the user's confirmation decision in step 235.

It will be appreciated that process 200 as described herein may support a variety of possible use cases. For example, the requesting process (i.e., unknown process 40C) is neither listed in whitelist 65, nor known to the user. In such a case, ransomware blocker 160 may perform steps 232 and 235 and proceed in accordance with the user decision from step 235.

In another example, the requesting process is not listed in whitelist 165, and the user has already decided (in a previous iteration of step 235) to permanently or conditionally block the file-access request. In such an example, ransomware blocker 160 may updated a local user policy section in whitelist 165 to indicate the permanent or conditional blocking. Accordingly, process control may flow through from step 230 to step 238.

In another example, the user may have previously decided to block unknown process 40C from a different type of file-access (e.g., file deletion vis-à-vis file write) and/or from a different file-type (e.g., a word processing document vis-à-vis a spreadsheet document). In such a case, step 235 may include a prompt indicating the earlier decision to block unknown process 40C from the file-access and/or the file-type from the previously blocked file-access request.

It will be appreciated that it is possible that the user may make mistakes and confirm file-access requests from non-legitimate application-processes 140, e.g., ransomware process 40B (FIG. 1). In order to mitigate the effect of such mistakes, ransomware blocker 160 may maintain a 'live cache' of stored files which represent previous version of files which were modified subsequent to user confirmation of requested file-access. The user may access this live cache to retrieve damaged files even if several file-access requests from non-legitimate application-process 140 were mistakenly allowed by the user's confirmation. It will be appreciated that ransomware typically attacks multiple targeted files in a short time frame, such that repeated prompts for user confirmation may be indicative of an ongoing attack. In such a case, the user may become aware of the attack after a mistakenly confirming a number of file-access requests, and the live cache may be used to recover from the attack.

It will be appreciated by one of ordinary skill in the art, that while the embodiments described herein have been described with respect to the prevention of ransomware attacks, the embodiments may also support the prevention of attacks by other types of malicious software as well. For example, ransomware blocker 160 may also be operative to prevent virus attacks and/or other types of malware.

It will be appreciated by one of ordinary skill in the art that while the embodiments herein have been described in the context of prevention of ransomware infection, the system and methods described may also facilitate the detection of viruses and malware that attack target computing systems without the element of ransom. It will similarly be appreciated that while the target population for ransomware may tend to be (although not necessarily exclusively) user data and media content files, viruses and malware tend to target (although not necessarily exclusively) system and executable files.

It is appreciated that software components described herein may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments described herein.

It is appreciated that various features described herein, which are, for clarity, described in the contexts of separate embodiments may also be provided in combination in a single embodiment. Conversely, various features described herein which are, for brevity, described in the context of a single embodiment may also be provided separately or in any suitable subcombination.

It will be appreciated by persons skilled in the art that the embodiments described herein are not limited by what has been particularly shown and described hereinabove. Rather the scope of the embodiments is defined by the appended claims and equivalents thereof:

What is claimed is:

1. A system comprising:
   a hardware processor;
   a whitelist comprising whitelisted application-processes allowed to perform file-access requests according to file-types of protected data files from among a multiplicity of the protected data files; and a ransomware blocker executable by the hardware processor and adapted to:
  intercept a particular file-access request from a requesting application-process to an operating system before said operating system receives and acts on said particular file-access request, wherein said particular file-access request is associated with accessing a particular protected data file from among said multiplicity of the protected data files;
  based on a lookup in said whitelist, determine whether said requesting application-process is allowed to perform said particular file-access request;
  upon determining in accordance with said lookup that said requesting application-process is allowed to perform said particular file-access request, allowing said requesting application-process to access said particular protected data file according to said particular file-access request; and
  upon determining in accordance with said lookup that said requesting application-process is not allowed to perform said particular file-access request:
    providing a prompt requesting authorization of said particular file-access request;
    receiving a user input response to said prompt;
    upon determining that said user input response indicates said authorization of said particular file-access request, caching a copy of said particular protected data file, and then allowing said requesting application-process to access said particular protected data file according to said particular file-access request;
    upon determining that said user input response does not indicate said authorization of said file-access request, preventing said application-process from accessing said particular protected data file; and
    updating said whitelist in accordance with said user input response, wherein said updating comprises tracking said user input response associated with said requesting application-process.

2. The system according to claim 1, wherein said particular file-access request is a request for write access.

3. The system according to claim 1, wherein said particular file-access request is a request for delete access.

4. The system according to claim 1, wherein said particular file-access request is a request for rename access.

5. A method for protecting a file, the method implemented on a computing device and comprising:
  intercepting a file-access request from an application-process to an operating system for said file before said operating system receives and acts on said file-access request;
  searching a whitelist for a whitelist entry associated with said application-process and a file-type for said file;
  upon determining according to said searching that said application-process is allowed to perform said file-access request, allowing said application-process to access said file according to said file-access request; and
  upon determining according to said searching that said application-process is not allowed to perform said file-access request:
    providing a prompt requesting authorization of said file-access request;
    receiving a user input response to said prompt;
    upon determining that said user input response indicates said authorization of said file-access request, caching a copy of said file, and then allowing said application-process to access said file according to said file-access request;
    upon determining that said user input response does not indicate said authorization of said file-access request, preventing said application-process from accessing said file; and
    updating said whitelist in accordance with said user input response, wherein said updating comprises tracking said user input response associated with said application-process and said file-type.

6. The method according to claim 5, wherein said updating further comprises:
  performing said updating in response to a defined number of consecutive identical instances of said user input response associated with said application-process and said file-type.

7. The method according to claim 5, wherein said updating further comprises:
  entering said user input response in said whitelist as a conditional authorization, wherein said conditional authorization is limited by at least one of a period of time and instances of said application-process performing said file-access request for said file-type.

8. The method according to claim 5, wherein said updating further comprises:
  updating a local user policy section in said whitelist to indicate that said application-process should be prevented from performing said file-access request for said file-type.

9. The method according to claim 5, wherein said providing a prompt comprises:
  receiving an authorization recommendation from an external whitelist service; and
  including an indication of said authorization recommendation in said prompt.

10. The method according to claim 5, further comprising:
  identifying said application-process in accordance with an associated digital signature.

11. The method according to claim 10, further comprising:
  generating said associated digital signature for an unidentified said application-process, where said unidentified said application-process does not have a publisher provided said associated digital signature.

12. The method according to claim 10, further comprising:
  performing in-process runtime verification of said digital signature before performing said allowing.

13. The method according to claim 5, wherein said file-type is identified for said file according to at least one of:
  a filename suffix associated with said file, or content-based file-type detection.

14. The method according to claim 5, wherein said application-process is ransomware.

15. The method according to claim 5, wherein said application-process is a computer virus.

16. One or more non-transitory computer readable storage media encoded with instructions that, when executed by a processor, cause the processor to perform operations, comprising:
  intercepting a file-access request from an application-process to an operating system for a file before said operating system receives and acts on said file-access request;
  searching a whitelist for a whitelist entry associated with said application-process and a file-type for said file, wherein said whitelist entry indicates that said application-process is allowed to access files of said file-type;

upon determining according to said searching that said application-process is allowed to perform said file-access request, allowing said application-process to access said file according to said file-access request; and upon determining according to said searching that said application-process is not allowed to perform said file-access request:
  providing a prompt requesting authorization of said file-access request;
  receiving a user input response to said prompt;
  upon determining that said user input response indicates said authorization of said file-access request, caching a copy of said file, updating said whitelist in accordance with said user input response, tracking said user input response associated with said application-process, and then allowing said application-process to access said file according to said file-access request;
  upon determining that said user input response does not indicate said authorization of said file-access request, preventing said application-process from accessing said file; and
  updating said whitelist in accordance with said user input response, wherein said updating comprises tracking said user input response associated with said application-process and said file-type.

17. The one or more non-transitory computer readable storage media of claim 16, wherein said updating further comprises:
  performing said updating in response to a defined number of consecutive identical instances of said user input response associated with said application-process and said file-type.

18. The one or more non-transitory computer readable storage media of claim 16, wherein said updating further comprises:
  entering said user input response in said whitelist as a conditional authorization, wherein said conditional authorization is limited by at least one of a period of time and instances of said application-process performing said file-access request for said file-type.

19. The one or more non-transitory computer readable storage media of claim 16, wherein said updating further comprises:
  entering said user input response in said whitelist as a conditional authorization, wherein said conditional authorization is limited by at least one of a period of time and instances of said application-process performing said file-access request for said file-type.

20. The one or more non-transitory computer readable storage media of claim 16, wherein said updating further comprises:
  updating a local user policy section in said whitelist to indicate that said application-process should be prevented from performing said file-access request for said file-type.

* * * * *